Sept. 18, 1934.  J. A. McGOVERN  1,974,189
STATIC REDUCING DEVICE
Filed April 23, 1930
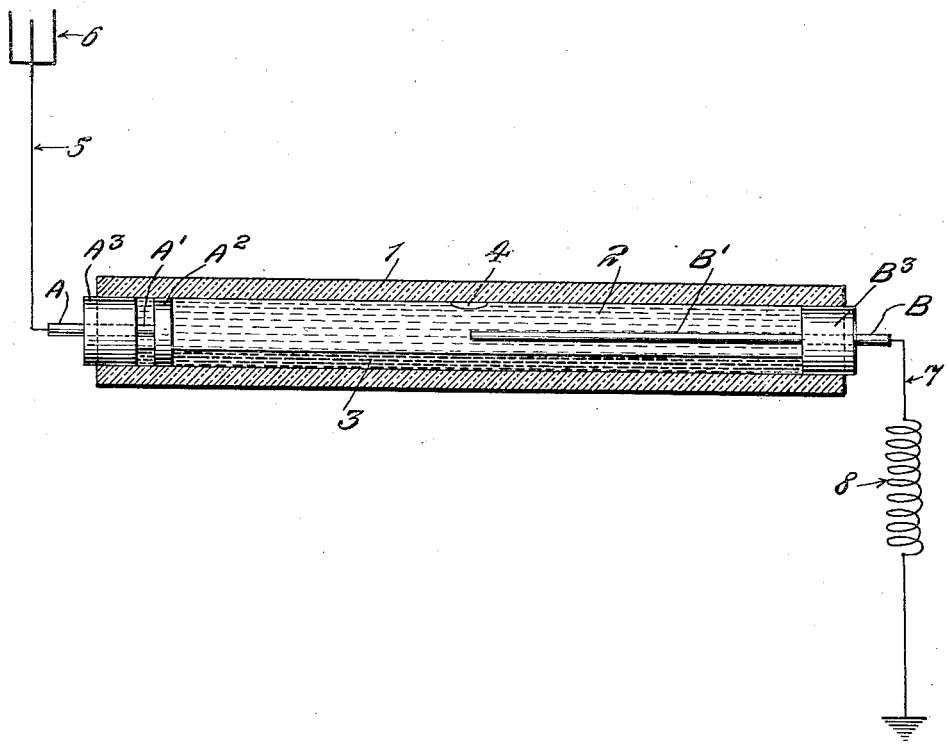
INVENTOR
James A. McGovern
BY Robert W Dougherty
ATTORNEY Patented Sept. 18, 1934

1,974,189

UNITED STATES PATENT OFFICE 1,974,189

STATIC REDUCING DEVICE

James A. McGovern, New York, N. Y.

Application April 23, 1930, Serial No. 446,476

1 Claim. (Cl. 250—20)

This invention relates to clarifiers for radio receivers and aims to provide an inexpensive, compact and effective clarifier which may be attached to the ordinary receiving sets in common use.

A particular object of my invention is to eliminate interference caused by atmospheric or conditions.

In previous clarifiers, small condensers have been used, but have proved unsatisfactory. I have invented means, consisting of two immiscible liquids of different densities and different specific resistances, for securing clear reception by eliminating interference without eliminating the high frequency wave.

An illustrative example of the means whereby I have accomplished this important result will be given in connection with a detailed description of a radio clarifier or static eliminator embodying this and other features of my invention and illustrated in the accompanying drawing in which:

Fig. 1 is a side view of the clarifier, showing in diagram the manner of connecting it with a radio receiving set.

The clarifier illustrated has a dielectric tube 1 containing mercury 3 and water 2 having a substance added thereto to increase the conductivity of said water. Tube 1 also contains a small air bubble 4 to permit expansion of the contents of the tube. The respective ends of the tube are sealed by stoppers A3, B3 consisting of rubber or any other insulating material. Terminal B projects through the center of stopper B3 and has an end B1 extending well within said tube. Terminal A projects through stopper A3 at the other end of said tube. An end A1 of terminal A extends within tube 1 for a short distance and has a disc A2 consisting of copper or other conducting material attached thereto.

In the preferred form of my device, graphite is suspended in the water to increase the conductivity of said water and the proportionate weights of the water and graphite composing said suspension are, respectively, 80:1. Tube 1 has a length of approximately four and one-half inches and an internal diameter of three-eighths of an inch, and the proportionate volumes of mercury 3 and water 2 are, respectively, 1:3.

To attach the clarifier to a receiving set, the tube is placed in a horizontal position, terminal A is connected to wire 5 leading from aerial 6, and terminal B is connected to wire 7 leading to primary coil 8.

In the operation of the clarifier, it is necessary that end B1 of terminal B have a relatively large surface in contact with the water, but that no part of said end be in contact with mercury 3 and that disc A2 be in contact with said mercury, but it is immaterial whether said disc is in contact with the water. It is also necessary that the respective surfaces of the mercury and the water in contact with each other be comparatively large.

To accomplish these results, tube 1 is placed in a horizontal position when in operation and the mercury 3 which is immiscible with, and heavier than, the water 2 sinks to the lower portion of the tube, thus presenting a large surface of mercury in contact with said water. The end B1 of the terminal B is composed of a relatively fine wire extending well within said tube and along its axis, and the quantity of mercury 3 is such that it does not extend to said axis, so that the end B1 is entirely surrounded by water 2. Disc A2 is of a circumference slightly less than the inner circumference of tube 1. Said disc is fixed transversely within said tube, and near one end thereof. Thus, disc A2 is in contact with mercury 3 and end B1 is in contact with water 2 only, regardless of what point on the circumference of horizontal tube 1 is uppermost.

Having described a specific embodiment of my invention, it is to be understood that changes may be made in the construction thereof without departing from the invention.

What is claimed is:

A static eliminator for radio apparatus consisting of a dielectric container, mercury, water, and means to increase the conductivity of said water, therein, a terminal extending through one end of, and well within, said container and in direct contact with said water only, and a second terminal extending through the other end of said container and in direct contact with said mercury and said water.

JAMES A. McGOVERN.